(12) United States Patent
Mori

(10) Patent No.: US 8,085,332 B2
(45) Date of Patent: Dec. 27, 2011

(54) IMAGE PICKUP APPARATUS, METHOD FOR CONTROLLING IMAGE PICKUP APPARATUS

(75) Inventor: Naomi Mori, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 359 days.

(21) Appl. No.: 12/422,695

(22) Filed: Apr. 13, 2009

(65) Prior Publication Data

US 2009/0262211 A1    Oct. 22, 2009

(30) Foreign Application Priority Data

Apr. 17, 2008    (JP) ................... 2008-107519

(51) Int. Cl.
*H04N 5/222*    (2006.01)
(52) U.S. Cl. .................................. 348/333.01
(58) Field of Classification Search .............. 348/333.01
See application file for complete search history.

(56) References Cited

U.S. PATENT DOCUMENTS

| 5,857,121 | A * | 1/1999 | Arai et al. ................. 396/51 |
| 6,191,819 | B1 * | 2/2001 | Nakano ................ 348/333.03 |
| 7,120,278 | B2 * | 10/2006 | Sukegawa et al. ........... 382/118 |
| 2005/0122401 | A1 * | 6/2005 | Horie ................... 348/207.99 |
| 2005/0128312 | A1 * | 6/2005 | Fredlund et al. ........... 348/222.1 |
| 2005/0275913 | A1 * | 12/2005 | Vesely et al. ................. 359/13 |
| 2007/0076960 | A1 * | 4/2007 | Takamori et al. ............ 382/224 |
| 2008/0192129 | A1 * | 8/2008 | Walker et al. ............. 348/231.2 |

FOREIGN PATENT DOCUMENTS

JP    2007-086460    4/2007

* cited by examiner

*Primary Examiner* — Lin Ye
*Assistant Examiner* — Amy Hsu
(74) *Attorney, Agent, or Firm* — Cowan, Liebowitz & Latman, P.C.

(57) ABSTRACT

The image pickup apparatus includes an optical viewfinder, a rear touch panel display, a registering part which registers whether an eye of a user viewing an object image through the optical viewfinder is a right eye or a left eye, a setting part which sets a non-enterable area where touch entry is not permitted in the touch panel to a first area when the right eye is registered, and to set the non-enterable area to a second area different from the first area when the left eye is registered. A controller controls the apparatus such that the apparatus does not perform an operation in response to a touch to the non-enterable area in the touch panel and the apparatus performs an operation in response to a touch to an area other than the non-enterable area in the touch panel.

11 Claims, 5 Drawing Sheets

IMAGE PICKUP APPARATUS, METHOD FOR CONTROLLING IMAGE PICKUP APPARATUS

BACKGROUND OF THE INVENTION

The present invention relates to an image pickup apparatus such as a digital camera, and in particular, relates to an image pickup apparatus including a rear touch panel display.

A lot of cameras have separately from an optical viewfinder a rear display as an electronic viewfinder to be used to determine an object composition and to confirm an image captured by image pickup.

Further, a camera has been disclosed in Japanese Patent Laid-Open No. 2007-86460 which includes a rear display with a touch panel function for selecting image pickup modes and performing various settings.

When using a camera such as a single-lens reflex camera having an optical viewfinder, a user generally views an object image through the optical viewfinder with his/her dominant eye. However, recent increase in size of the rear display brings part of a user's face such as a nose into contact with a display surface of the rear display in both a case where the user views the object image through the optical viewfinder with his/her right eye and a case where the user views the object image through the optical viewfinder with his/her left eye. In these cases, if a touch entry operation is permitted in a substantially entire area of the rear display, the touch entry operation is effectively accepted to result in an operation of the camera which is not intended by the user.

SUMMARY OF THE INVENTION

The present invention provides an image pickup apparatus and a control method thereof capable of preventing an operation of the apparatus which is not intended by a user when part of a face of a user who views an object image through an optical viewfinder comes into contact with a touch panel.

The present invention provides as one aspect thereof an image pickup apparatus which is provided with an optical viewfinder. The apparatus includes a touch panel provided in a rear display of the apparatus, a registering part configured to register whether an eye of a user viewing an object image through the optical viewfinder is a right eye or a left eye, a setting part configured to set a non-enterable area where touch entry is not permitted in the touch panel to a first area when information indicating that the right eye is registered by the registering part, and to set the non-enterable area to a second area different from the first area when information indicating that the left eye is registered by the registering part, and a controller configured to control the apparatus such that the apparatus does not perform an operation in response to a touch to the non-enterable area in the touch panel and the apparatus performs an operation in response to a touch to an area other than the non-enterable area in the touch panel.

The present invention provides as another aspect thereof a method for controlling an image pickup apparatus which is provided with an optical viewfinder and a rear touch panel display. The method includes a registering step of registering whether an eye of a user viewing an object image through the optical viewfinder is a right eye or a left eye, a setting step of setting a non-enterable area where touch entry is not permitted in the rear touch panel display to a first area when information indicating that the right eye is registered in the registering step and setting the non-enterable area to a second area different from the first area when information indicating that the left eye is registered in the registering step, and a controlling step of controlling the apparatus such that the apparatus does not perform an operation in response to a touch to the non-enterable area in the rear touch panel display and the apparatus performs an operation in response to a touch to an area other than the non-enterable area in the rear touch panel display.

The present invention provides as still another aspect thereof a computer-readable medium which stores a computer program for causing an image pickup apparatus including an optical viewfinder and a rear touch panel display to execute processing that includes a registering step of registering whether an eye of a user viewing an object image through the optical viewfinder is a right eye or a left eye, a setting step of setting a non-enterable area where touch entry is not permitted in the rear touch panel display to a first area when information indicating that the right eye is registered in the registering step and setting the non-enterable area to a second area different from the first area when information indicating that the left eye is registered in the registering step, and a controlling step of controlling the apparatus such that the apparatus does not perform an operation in response to a touch to the non-enterable area in the rear touch panel display and the apparatus performs an operation in response to a touch to an area other than the non-enterable area in the rear touch panel display.

The present invention provides as yet still another aspect thereof an image pickup apparatus which is provided with an optical viewfinder. The apparatus includes a touch panel provided in a rear display of the apparatus, a detector configured to detect approach of an eye to the optical viewfinder, a setting part configured to set a non-enterable area where touch entry is not permitted in the rear touch panel display and which is part of the rear touch panel display, in response to detection of the approach of the eye to the optical viewfinder by the detector, and a controller configured to control the apparatus such that the apparatus does not perform an operation in response to a touch to the non-enterable area in the rear touch panel display and the apparatus performs an operation in response to a touch to an area other than the non-enterable area in the rear touch panel display.

The present invention provides as still further another aspect thereof a method for controlling an image pickup apparatus which is provided with an optical viewfinder and a rear touch panel display. The method includes a detecting step of detecting approach of an eye to the optical viewfinder, a setting step of setting a non-enterable area where touch entry is not permitted in the rear touch panel display and which is part of the rear touch panel display, in response to detection of the approach of the eye to the optical viewfinder in the detecting step, and a controlling step of controlling the apparatus such that the apparatus does not perform an operation in response to a touch to the non-enterable area in the rear touch panel display and the apparatus performs an operation in response to a touch to an area other than the non-enterable area in the rear touch panel display.

The present invention provides as yet still further another aspect thereof a computer-readable medium which stores a computer program for causing an image pickup apparatus including an optical viewfinder and a rear touch panel display to execute processing that includes a detecting step of detecting approach of an eye to the optical viewfinder, a setting step of setting a non-enterable area where touch entry is not permitted in the rear touch panel display and which is part of the rear touch panel display, in response to detection of the approach of the eye to the optical viewfinder in the detecting step, and a controlling step of controlling the apparatus such that the apparatus does not perform an operation in response to a touch to the non-enterable area in the rear touch panel display and the apparatus performs an operation in response to a touch to an area other than the non-enterable area in the rear touch panel display.

Other aspects of the present invention will become apparent from the following description and the attached drawings.

DESCRIPTION OF THE EMBODIMENTS

Exemplary embodiments of the present invention will hereinafter be described with reference to the accompanying drawings.

Embodiment 1

Figure 1:
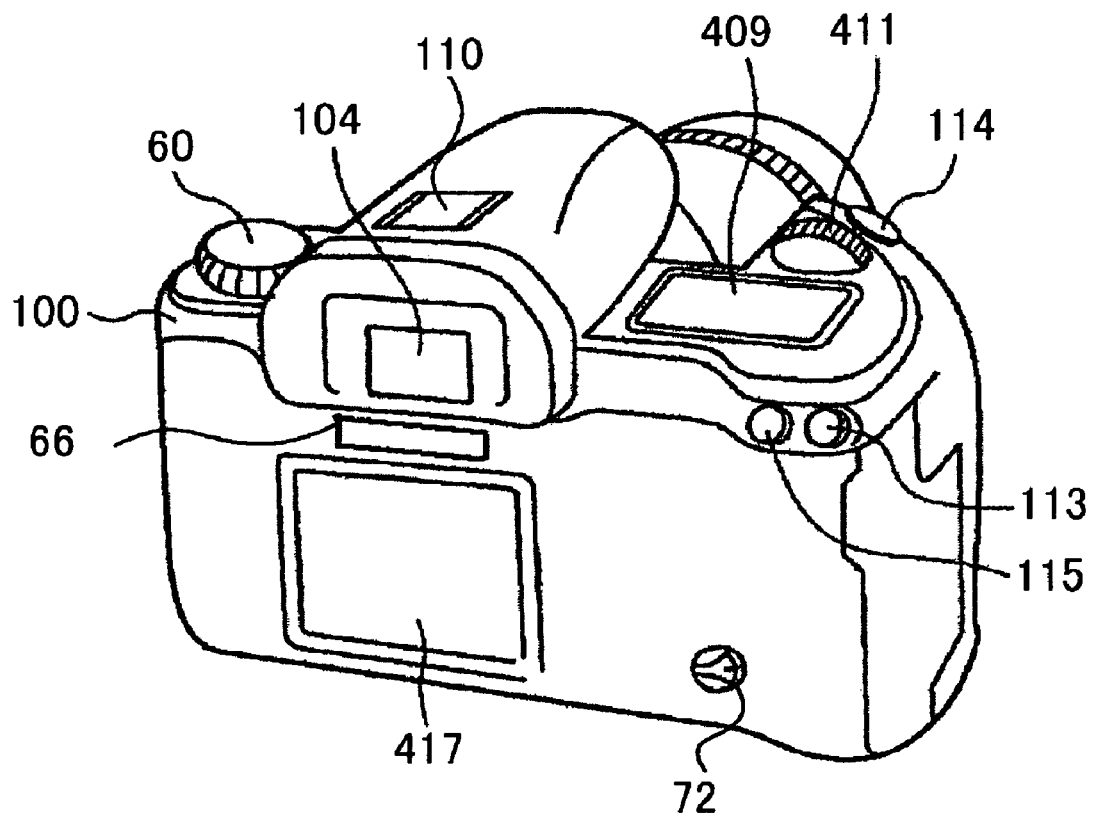
FIG. 1 is an external view of a camera system including a digital single-lens reflex camera that is an embodiment of the present invention.
Figure 2:
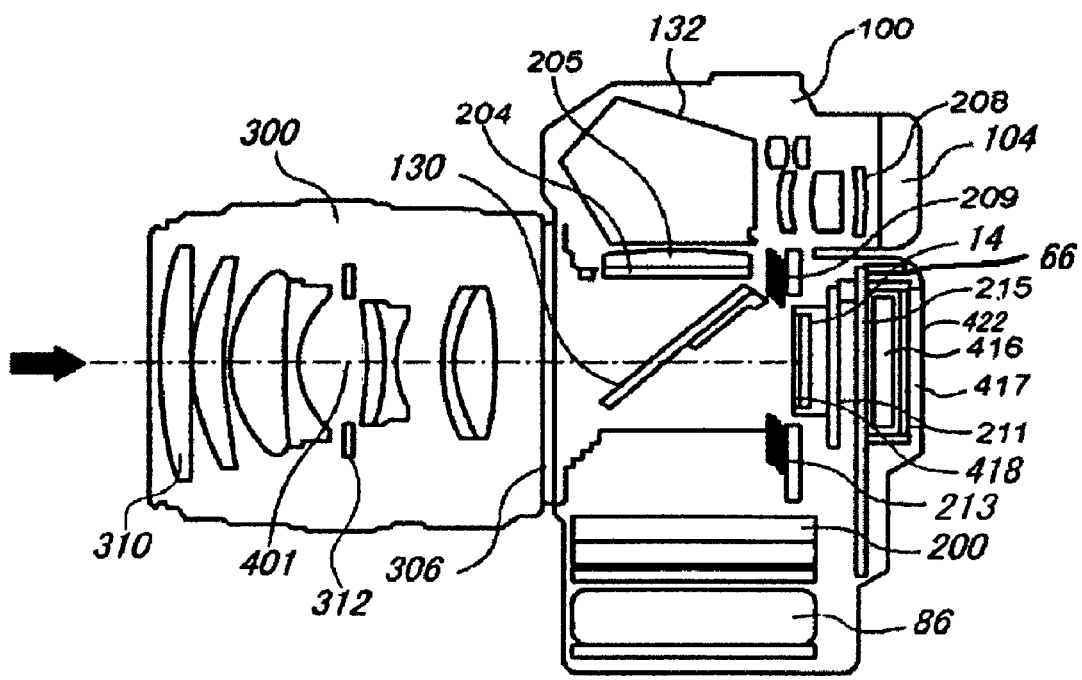
FIG. 2 is a cross-sectional view showing an internal configuration of the camera system.

FIG. 1 is an external view of a camera system including a digital single-lens reflex camera that is an embodiment of the present invention. FIG. 2 shows an internal configuration of the camera system.

In FIG. 1, reference numeral 100 denotes a digital single-lens reflex camera (hereinafter referred to as "camera body"). An upper part of the camera body 100 is provided with an accessory shoe 110, an optical viewfinder 104, an AE (auto exposure) lock button 115, a focus detection area selection button 113 for selecting a focus detection area where an AF (auto focus) operation is performed, and a release button 114 for instructing an image pickup operation.

Moreover, the upper part of the camera body 100 is provided with an electronic dial 411, a mode dial 60, and an external display unit 409. The electronic dial 411 is used as an input part to input numerical values relating to camera operations and to switch the image pickup mode by being operated with other operation buttons. The external display unit 409 is constituted by a display device such as a liquid crystal panel, and displays image pickup condition information such as a shutter speed, an aperture value and a set image pickup mode and other information.

A rear of the camera body 100 is provided with an LCD monitor unit 417 that is a rear display unit, and a power switch 72. The LCD monitor unit 417 displays an image obtained by image pickup and various menu items.

A transmissive LCD is used as the LCD monitor unit 417, and a backlight unit 416 is provided at a back face thereof as shown in FIG. 2. The LCD monitor unit 417 and the backlight unit 416 constitute an image displaying part 28 shown in FIG. 3.

An LCD monitor touch panel 422 is provided at a front face of the LCD monitor unit 417. A touch operation (touch entry) on the touch panel 422 by a user enables switching of contents displayed on the LCD monitor unit 417 and various settings. For example, the touch operation enables selection of the menu items displayed on the LCD monitor unit 417 and instruction of a setting relating to the selected menu item. Further, for example, the touch operation enables settings of a shutter speed value, an aperture value, a focus detection area, an exposure correction value, a flash adjustment correction value, a photometry mode, a drive mode, an ISO value, an auto focus mode, a white balance value, and an exposure correction bracket value.

A front face of the camera body 100 is provided with a mount 106 (see FIG. 3) to which a mount 306 provided in an interchangeable lens 300 is detachably attached. Reference numeral 401 denotes an image pickup optical axis.

The interchangeable lens 300 includes a lens unit 310 constituted by plural lenses and an aperture stop 312.

Moreover, a mirror 130 disposed inside the camera body 100 is movable between a position in an image pickup optical path to reflect object light from the lens unit 310 toward a viewfinder optical system as shown in FIG. 2 and a position out of the image pickup optical path.

An object image is formed with the object light reflected by the mirror 130 on a focusing plate 204. Reference numeral 205 denotes a condenser lens for improving viewfinder visibility, and reference numeral 132 denotes a pentagonal dach prism. The pentagonal dach prism 132 introduces the object light that has passed through the focusing plate 204 and the condenser lens 205 to an eyepiece lens 208. The elements from the focusing plate 204 to the eyepiece lens 208 constitute an optical viewfinder 104. The user can view the object image formed on the focusing plate 204 through the eyepiece lens 208.

Figure 3:
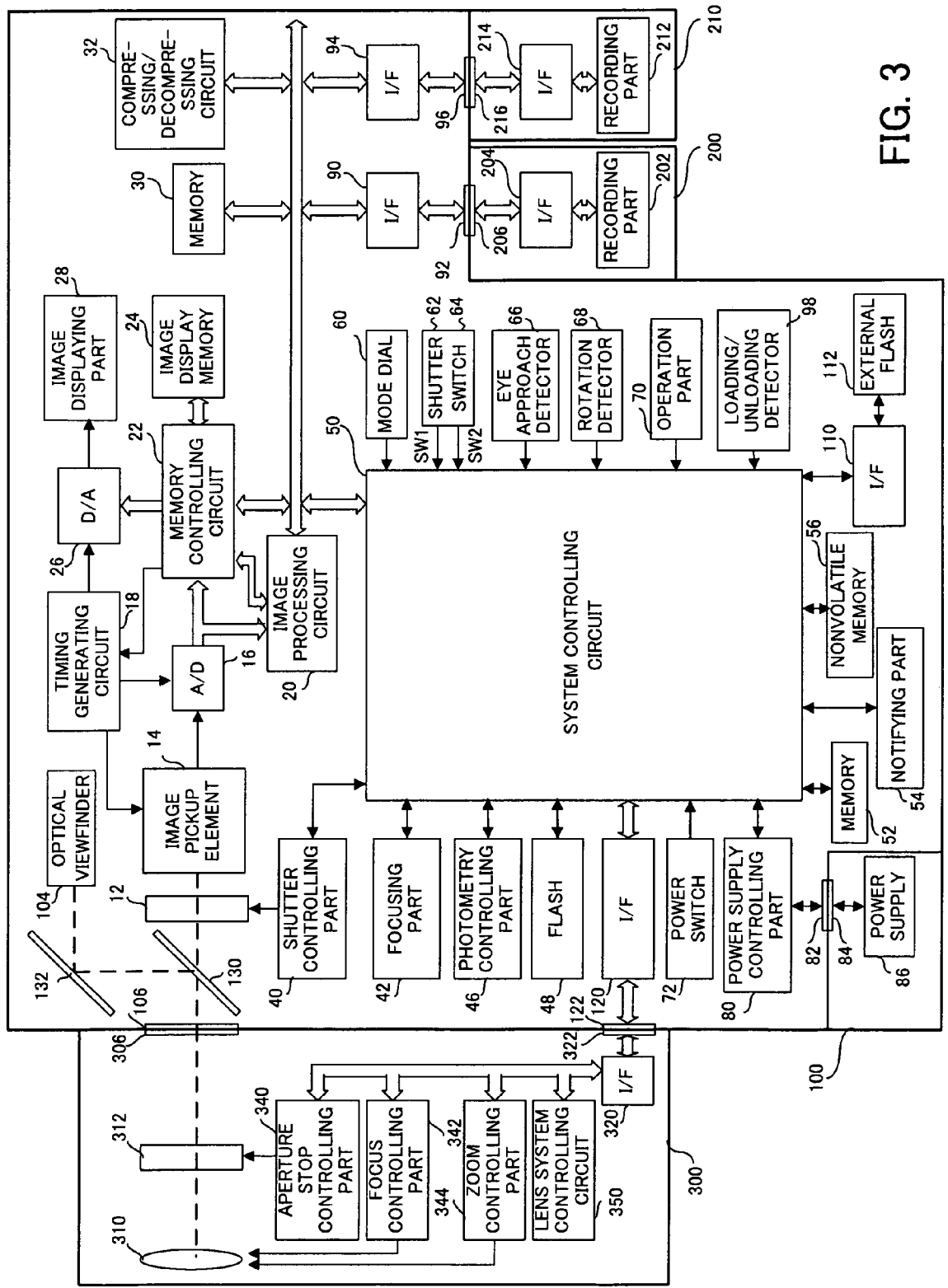
FIG. 3 is a block diagram showing a circuit configuration of the camera system.

Reference numerals 209 and 213 respectively denote a rear curtain and a front curtain which constitute a focal-plane shutter 12 (see FIG. 3). These rear and front curtains 209 and 213 are opened to expose an image pickup element 14 placed at the rear thereof for a predetermined time. The image pickup element 14 is constituted by a CCD sensor or a CMOS sensor, and an optical low-pass filter 418 is provided at its front face.

Further, the image pickup element 14 is connected with a printed wiring board 211. A display circuit board 215 is disposed behind the printed wiring board 211. The LCD monitor unit 417 and the backlight unit 416 are disposed on a face of the display circuit board 215 opposite to the printed wiring board 211.

Reference numeral 200 denotes a recording medium which stores image data obtained by image pickup. The recording medium 200 is formed by a semiconductor memory, a hard disk or the like. Reference numeral 86 denotes a secondary battery. The recording medium 200 and the secondary battery 86 are detachably attached to the camera body 100.

Reference numeral 66 denotes an eye approach detector which detects whether or not the user views the object image through the optical viewfinder 104 (eyepiece lens 208), that is, whether or not a user's eye approaches the eyepiece lens 208. When the eye approach detector 66 detects approach of the user's eye (hereinafter referred to as "eye approach"), the backlight unit 416 is turned off and display of the LCD monitor unit 417 is cleared. In this embodiment, a touch operation on the LCD monitor touch panel 422 is accepted irrespective of whether or not the LCD monitor unit 417 is in a display state.

However, there is a case where display contents of the LCD monitor unit 417 or turning on/off of the backlight unit 416 is not changed even when the eye approach detector 66 detects the eye approach, depending on the display contents or settings of the LCD monitor unit 417.

FIG. 3 shows a circuit configuration of the camera system of this embodiment constituted by the camera body 100 and the interchangeable lens 300. The components shown in FIGS. 1 and 2 are denoted by the same reference numerals as those in FIGS. 1 and 2.

Description will be first made of the circuit configuration in the interchangeable lens 300. The interchangeable lens 300 is provided with a connector 322 and an interface 320 for electrically connecting the interchangeable lens 300 with the camera body 100. The connector 322 and the interface 320 enable communication between a lens system controlling circuit 350 and a system controlling circuit 50 which is provided in the camera body 100 through a connector 122 and an interface 120 which are provided in the camera body 100. The lens system controlling circuit 350 and the system controlling circuit 50 will be described later.

Reference numeral 340 denotes an aperture stop controlling part that controls the aperture stop 312 based on photometry information from a photometry controlling part 46 while cooperating with a shutter controlling part 40 that controls the shutter 12. The shutter controlling part 40 and the photometry controlling part 46 will be described later. Reference numeral 342 denotes a focus controlling part that controls a focusing operation of the lens unit 310, and reference numeral 344 denotes a zoom controlling part that controls variation of magnification (zooming) of the lens unit 310.

The lens system controlling circuit 350 controls the entire interchangeable lens 300. The lens system controlling circuit 350 includes a memory which stores data such as constants, variables and computer programs used for various operations.

Next, description will be made of a circuit configuration in the camera body 100. The object light that has passed through the lens unit 310 and the aperture stop 312 passes through the opened shutter 12 in a state where the mirror 130 is out of the image pickup optical path, to form an object image on the image pickup element 14. Note that, if the mirror 130 is a half mirror, the mirror 130 may be in the image pickup optical path.

Reference numeral 16 denotes an A/D converter that converts an analog signal (image data) output from the image pickup element 14 into a digital signal. Reference numeral 18 denotes a timing generating circuit that supplies clock signals and control signals to the image pickup element 14, the A/D converter 16 and a D/A converter 26. The timing generating circuit 18 is controlled by a memory controlling circuit 22 and the system controlling circuit 50.

Reference numeral 20 denotes an image processing circuit that performs pixel interpolation processing and color conversion processing on data from the A/D converter 16 or data from the memory controlling circuit 22. The image processing circuit 20 performs predetermined calculation processing using image data output from the A/D converter 16. The system controlling circuit 50 performs in a TTL method, based on calculation results from the image processing circuit 20, auto focus (AF) processing for controlling a focusing part 42, auto exposure (AE) processing for controlling the shutter controlling part 40, and flash lightening (EF) processing. Further, the image processing circuit 20 performs auto white balance (AWB) processing in the TTL method based on the calculation result from the A/D converter 16.

The memory controlling circuit 22 controls the A/D converter 16, the timing generating circuit 18, the image processing circuit 20, an image display memory 24, the D/A converter 26, a memory 30 and a compressing/decompressing circuit 32. The image data output from the A/D converter 16 is written into the image display memory 24 or the memory 30 through the image processing circuit 20 and the memory controlling circuit 22 or only through the memory controlling circuit 22.

The image displaying part 28 displays, on the LCD monitor unit 417 shown in FIGS. 1 and 2, displaying image data which is an analog image signal converted by the D/A converter 26 and written in the image display memory 24. The image displaying part 28 sequentially displays a series of the image data obtained by image pickup on the LCD monitor unit 417 to achieve an electronic viewfinder (EVF) function. Moreover, the image displaying part 28 can arbitrarily turn the display on the LCD monitor unit 417 on and off in response to instructions from the system controlling circuit 50.

The memory 30 stores still images obtained by still image pickup. The memory 30 is also used as a frame buffer into which frame images obtained by moving image pickup are continuously written at a predetermined rate. In addition, the memory 30 is also used as a work area of the system controlling circuit 50.

The compressing/decompressing circuit 32 compresses and decompresses image data by using a well-known image compression method. The compressing/decompressing circuit 32 reads the image data stored in the memory 30 to perform compression processing or decompression processing on the image data, and then writes the image data after the processing into the memory 30 again.

The shutter controlling part 40 controls, as described above, the shutter 12 based on the photometry information from the photometry controlling part 46 while cooperating with the aperture stop controlling part 340.

The focusing part 42 detects a phase difference of two object images formed with the object light transmitted through the mirror 130 and then introduced to the focusing part 42 by a sub-mirror, not shown, to perform the AF processing. The AF processing may be performed by using a detection result by the focusing part 42 and a result of calculation performed on the image data from the A/D converter 16 by the image processing circuit 20.

The photometry controlling part 46 performs the AE processing based on an output from a photometry sensor, not shown.

Reference numeral 48 denotes a flash which has an AF-assist light projection function and a flash adjustment function. The photometry controlling part 46 performs the EF processing in cooperation with the flash 48.

The system controlling circuit 50 includes a CPU and a memory, and controls the entire camera body 100. Reference numeral 52 denotes a memory which stores data such as constants, variables or computer programs used for operations of the system controlling circuit 50.

Reference numeral 54 denotes a notifying part which notifies an operation state of the camera and various messages to the outside by using characters, images, voices or the like, in accordance with execution of the computer program in the system controlling circuit 50. The notifying part 54 performs visual display on a display device such as an LCD or an LED, and voice notification. Moreover, the notifying part 54 includes an LCD unit disposed in the optical viewfinder 104. The LCD unit performs various information displays such as an aperture value display, a shutter speed display, an in-focus state display, a hand jiggling warning display, and an exposure correction display.

Reference numeral 56 denotes a nonvolatile memory such as an EEPROM which is capable of electrically recording and erasing data.

The mode dial 60 is a switch to select various image pickup modes. A shutter switch (SW1) 62 is turned on by a first stroke operation (half-pressing operation) of the release button 114, which instructs start of the AF processing, the AE processing, the AWB processing and the EF processing. A shutter switch (SW2) 64 is turned on by a second stroke operation (full-pressing operation) of the release button 114, which instructs start of a series of image pickup processing including exposure processing, development processing, and record processing.

An operation part 70 contains various buttons and the above-described LCD monitor touch panel 422. The system controlling circuit 50 performs various operations according to signals from the operation part 70.

The power switch 72 is a switch to turn on and off power supply of the camera body 100. Operations of the power switch 72 also can turn on and off power supply of various attachment devices connected with the camera body 100 such as the interchangeable lens 300, an external flash 112, the recording medium 200, and another attachment device 210 such as a personal computer.

Reference numeral 80 denotes a power supply controlling part which is constituted by a battery detecting part, a DC-DC converter, and a switching circuit which switches a block to which electric power is supplied. The power supply controlling part 80 detects battery loading, battery type and battery power, and controls the DC-DC converter based on the detection results and an instruction from the system controlling circuit 50 to supply electric power with a necessary voltage to each of the circuits and parts including the recording medium 200 for a necessary period.

Reference numerals 82 and 84 denote connectors which supply the electric power from the battery 86 (power supply) to the camera body 100, the interchangeable lens 300, the external flash 112, the recording medium 200, and the other attachment device 210.

Reference numerals 90 and 94 denote interfaces for communication with the recording medium 200 and the attachment device 210. Reference numerals 92 and 96 denote connectors which are connected to the recording medium 200 and the attachment device 210. Reference numeral 98 denotes a loading/unloading detector which detects whether or not the recording medium 200 and the attachment device 210 are connected to the connectors 92 and 96.

The recording medium 200 and the attachment device 210 respectively include recording parts 202 and 212 each constituted by a semiconductor memory, a magnetic disk or the like, interfaces 204 and 214 for communication with the camera body 100, and connectors 206 and 216 which are connected to the camera body 100.

Reference numeral 68 denotes a rotation detector which detects an inclination of the camera body 100. The display of the LCD monitor unit 417 and the image pickup operation are changed according to the detected inclination.

Next, description will be made of processing relating to the image displaying part 28 and the LCD monitor touch panel 422 performed by the system controlling circuit 50 which serves as a registrating part, a setting part and a controller in this embodiment with reference to FIGS. 4 to 6 and FIG. 8. This processing is performed according to a computer program stored in the memories 52 and 56.

Figure 4:
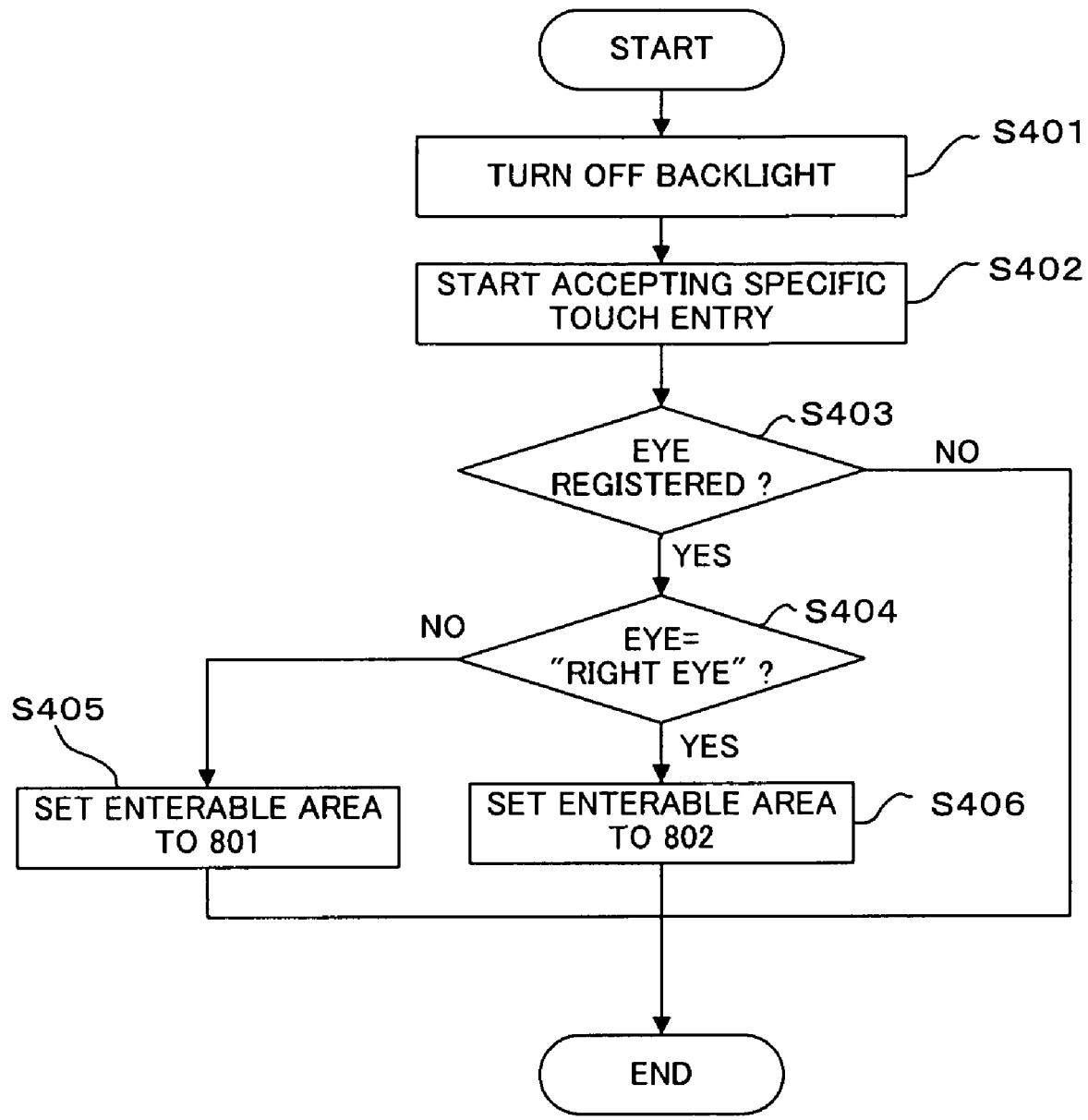
FIG. 4 is a flowchart showing set processing for setting an enterable area on a touch panel in the camera of the embodiment.

FIG. 4 shows processing for setting an enterable area where a touch operation (touch entry) is accepted (permitted) in the touch panel 422.

In FIG. 4, when detecting eye approach of a user to the optical viewfinder 104 through the eye approach detector 66 in a state where the camera body 100 has started its operation, the system controlling circuit 50 turns off the backlight unit 416 (S401). Then, the system controlling circuit 50 permits an operation (an accepting operation of a specific touch entry shown in FIG. 5) during a period where the eye approach is detected (S402).

Next, the system controlling circuit 50 determines whether or not a registration of a dominant eye that is information on an eye which the user normally uses for viewing an object image through the optical viewfinder 104 has been made, with reference to a set value stored in the nonvolatile memory 56 (S403). The registration of the dominant eye can be made through a touch operation on the LCD monitor touch panel 422 or an operation of another switch in a state where a menu item for dominant eye registration is displayed in the LCD monitor unit 417. When the operation for the registration of the dominant eye is made, the system controlling circuit 50 registers (stores) information on the dominant eye in the nonvolatile memory 56. If the registration of the dominant eye has not been made at S403, the system controlling circuit 50 ends the processing shown in FIG. 4.

Figures 8A, 8B:
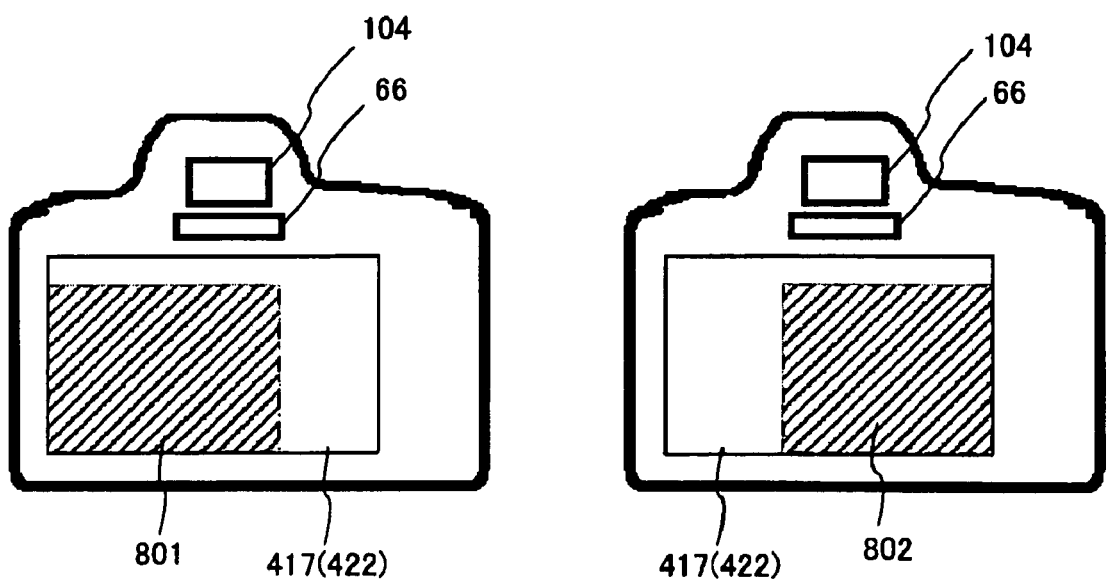
FIG. 8A shows the enterable area on the touch panel in the camera of the embodiment when a user views an object image through an optical viewfinder with a left eye.
FIG. 8B shows the enterable area on the touch panel in the camera of the embodiment when a user views an object image through an optical viewfinder with a right eye.

On the other hand, if the registration of the dominant eye has been made at S403, the system controlling circuit 50 determines whether or not the registered dominant eye is a "right eye" (S404). If the registered dominant eye is the "right eye", the system controlling circuit 50 sets a touch entry acceptable area which is the enterable area in the LCD monitor touch panel 422 to an area 802 showing in FIG. 8B (S406), and then ends the processing shown in FIG. 4. An area other than the touch entry acceptable area 802 in the LCD monitor touch panel 422 shown in FIG. 8B is set as a non-enterable area where touch entry is not permitted. In the LCD monitor touch panel 422 shown in FIG. 8B, the non-enterable area (area other than the touch entry acceptable area 802) where the touch entry is not permitted when the user views the object image through the optical viewfinder 104 with the right eye is set as an area for the right eye (first area). The touch entry acceptable area 802 where the touch entry is permitted when the user views the object image through the optical viewfinder 104 with the right eye is set as an area other than the area for the right eye.

If at S404 the dominant eye is not the "right eye", that is, the dominant eye is a "left eye", the system controlling circuit 50 sets the touch entry acceptable area (enterable area) in the LCD monitor touch panel 422 to an area 801 showing in FIG. 8A (S405), and then ends the processing shown in FIG. 4. An area other than the touch entry acceptable area 801 in the LCD monitor touch panel 422 shown in FIG. 8A is set as a non-enterable area where the touch entry is not permitted. In the LCD monitor touch panel 422 shown in FIG. 8A, the non-enterable area (area other than the touch entry acceptable area 801) where the touch entry is not permitted when the user views the object image through the optical viewfinder 104 with the left eye is set as an area for the left eye (second area). The touch entry acceptable area 801 where the touch entry is permitted when the user views the object image through the optical viewfinder 104 with the left eye is set as an area other than the area for the left eye.

FIGS. 8A and 8B respectively show the touch entry acceptable areas 801 and 802 in the LCD monitor touch panel 422 when the camera body 100 is at a normal (horizontal) position. The touch entry acceptable area 801 is an area biasedly located on a left side in the LCD monitor touch panel 422 with respect to the optical viewfinder 104 (for example, an area whose right end is located at a position corresponding to that of a right end of a viewing window of the optical viewfinder 104). This touch entry acceptable area 801 is an area with which part of a face, such as a nose, of the user viewing the object image through the optical viewfinder 104 with the left eye hardly comes into contact. On the other hand, the touch entry acceptable area 802 is an area biasedly located on a right side in the LCD monitor touch panel 422 with respect to the optical viewfinder 104 (for example, an area whose left end is located at a position corresponding to that of a left end of the viewing window of the optical viewfinder 104). This touch entry acceptable area 802 is an area with which part of a face of the user viewing the object image through the optical viewfinder 104 with the right eye hardly comes into contact.

When the user performs a touch operation with a finger in the touch entry acceptable area on the touch panel 422 in a state where the eye approach to the optical viewfinder 104 is detected, the system controlling circuit 50 accepts the touch operation as an effective operation. On the other hand, even if the touch operation is performed in the area other than the touch entry acceptable area on the touch panel 422, the system controlling circuit 50 ignores (that is, does not accept) the touch operation.

Figure 7:
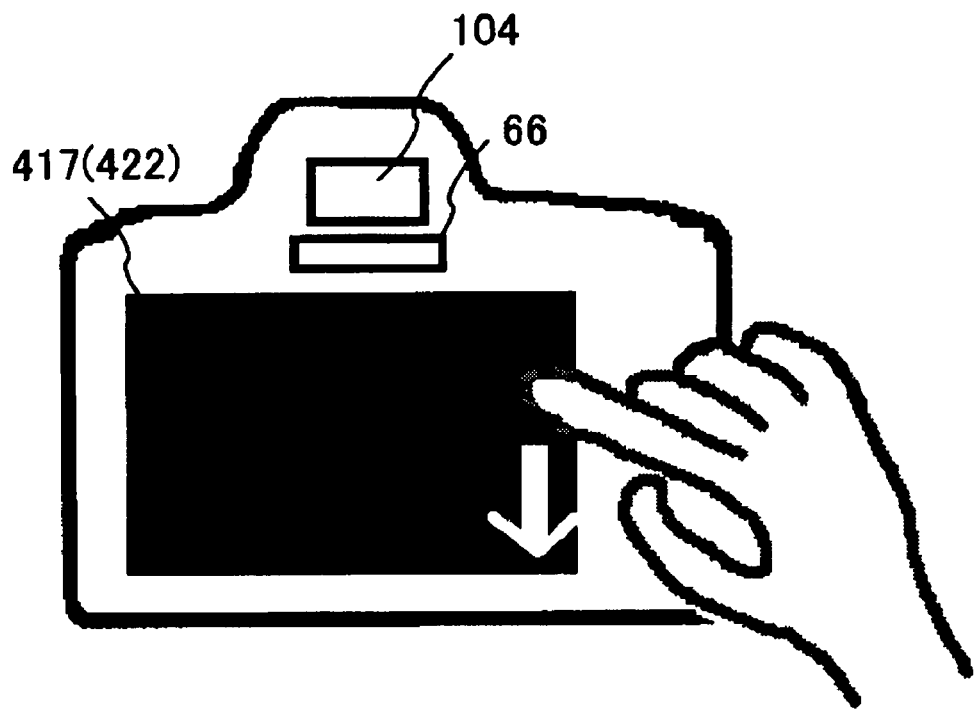
FIG. 7 is an example of a touch entry operation on the touch panel in the camera of the embodiment.

Next, description will be made of the accepting operation of the specific touch entry shown in FIG. 5. When the user touches the touch panel 422 to perform a horizontal touch operation or a vertical touch operation as shown in FIG. 7 after the touch entry acceptable area in the touch panel 422 is set by the processing shown in FIG. 4, the system controlling circuit 50 calculates a moving direction and a moving distance of a touched position on the touch panel 422 (S501).

Then, the system controlling circuit 50 determines whether or not the moving direction of the touched position is a "vertical direction" (S502). If the moving direction is the "vertical direction", the system controlling circuit 50 changes the aperture value which is one of set values stored in the nonvolatile memory 56 (S503). If the moving direction is not the "vertical direction", the system controlling circuit 50 determines whether or not the moving direction of the touched position is a "horizontal direction" (S504). If the moving direction is the "horizontal direction", the system controlling circuit 50 changes the shutter speed value which is one of the set values stored in the nonvolatile memory 56 (S505). If the moving direction is not also the "horizontal direction", the system controlling circuit 50 ends the processing shown in FIG. 5.

Figure 5:
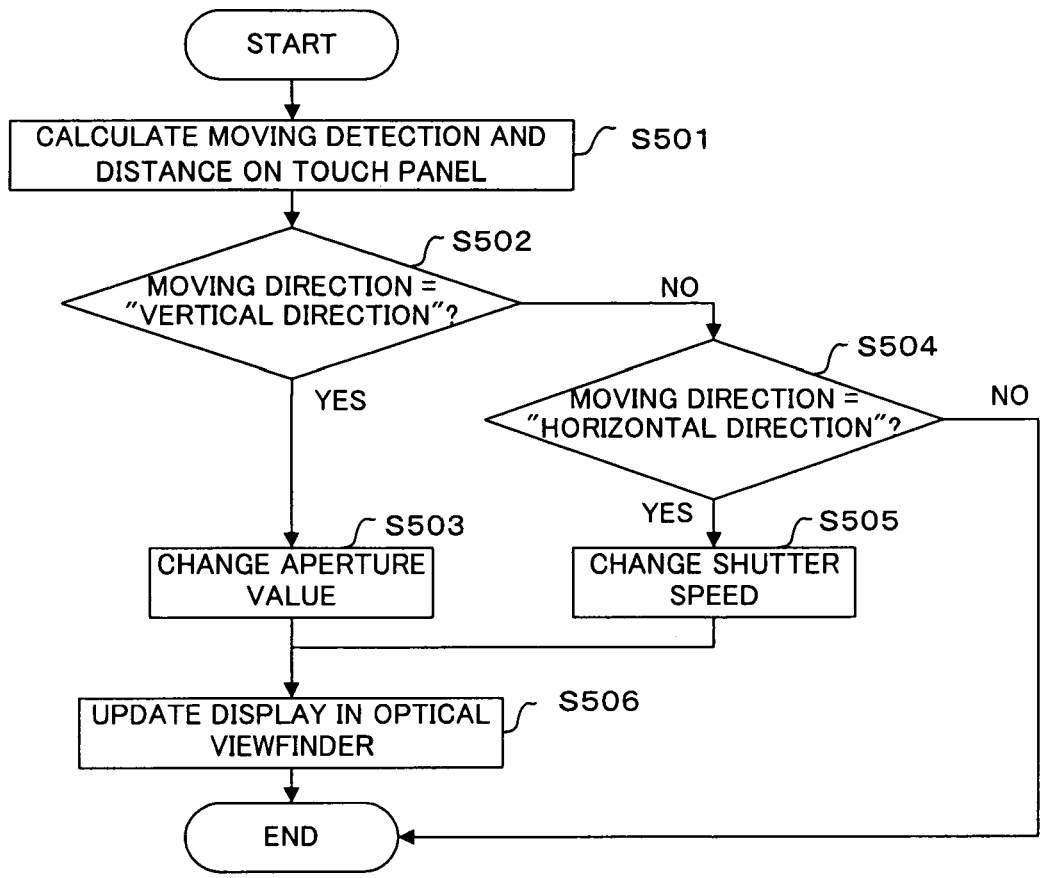
FIG. 5 is a flowchart showing specific entry acceptance processing in the camera of the embodiment.

Further, the system controlling circuit 50 updates display of the LCD unit (notifying part 54) provided in the optical viewfinder 104 such that the updated display corresponds to the aperture value changed at S503 or the shutter speed value changed at S505 (S506), and then ends the processing shown in FIG. 5.

The description was made of the case where the aperture value or the shutter speed value is changed by the touch operation on the touch panel 422. However, instead of them, another set value may be changed such as the focus detection area, the exposure correction value, the flash adjustment correction value, the photometry mode, the ISO value, the auto focus mode, the white balance value, and the exposure correction bracket value.

As described above, in this embodiment, even if the part of the face of the user viewing the object image through the optical viewfinder 104 comes into contact with the area other than the enterable area on the touch panel 422, the contact (touch) is not accepted as an effective touch operation, and thereby an operation of the camera in response to the contact is not performed. Therefore, an operation of the camera in response to contact (touch) which is not intended by the user can be prevented. On the other hand, if the user touches the enterable area, the touch is accepted as an effective touch operation, and thereby an operation of the camera in response to the touch is performed. Therefore, the user can comfortably operate the camera.

Figure 6:
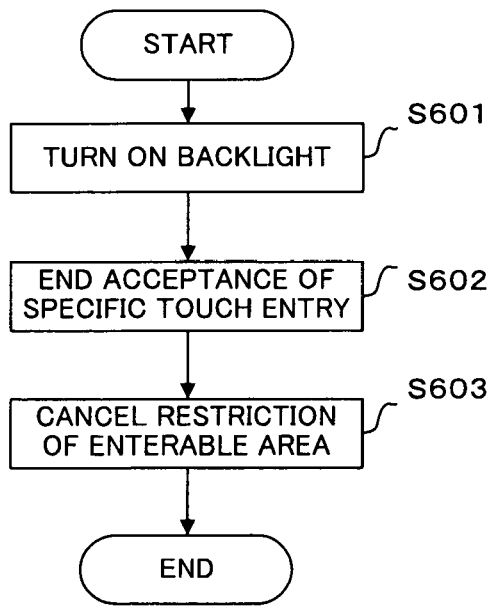
FIG. 6 is a flowchart showing eye withdrawal processing in the camera of the embodiment.

FIG. 6 shows processing performed in a case where withdrawal of the eye (hereinafter referred to as "eye withdrawal") from the optical viewfinder 104 is detected. When detecting that the user stops viewing the object image through the optical viewfinder 104, that is, detecting the eye withdrawal from the optical viewfinder 104 through the eye approach detector 66, the system controlling circuit 50 turns on the backlight unit 416 (S601). In addition, the system controlling circuit 50 ends the accepting operation of the specific touch entry shown in FIG. 5 (S602).

Next, the system controlling circuit 50 cancels the restriction of the touch entry acceptable area on the touch panel 422 (S603), and then ends the processing shown in FIG. 6.

The above embodiment (FIGS. 8A and 8B) described the setting of the enterable area on the touch panel 422 in the case where the camera is used at the horizontal (normal) position. However, an enterable area when the camera is used at the vertical position may be set to an area different from that when the camera is used at the horizontal position. The system controlling circuit 50 detects an inclination of the camera through the rotation detector 68 which is an inclination sensor to determine a camera position based on the detected inclination. Then, the system controlling circuit 50 sets, when detecting the eye approach in a state where the camera is at the horizontal position, the enterable area as shown in FIG. 8A or FIG. 8B. On the other hand, the system controlling circuit 50 sets, if determining that the camera is at the vertical position, an enterable area for the right eye for the vertical position when the dominant eye information is the "right eye", and sets an enterable area for the left eye for the vertical position when the dominant eye information is the "left eye". Alternatively, the restriction of the enterable area may be canceled when the camera is used at the vertical position.

Moreover, the above embodiment (FIG. 7) described the case where the horizontal touch operation or the vertical touch operation as the specific touch entry on the touch panel is accepted in the state where the backlight unit is turned off. However, a touch operation like a dial operation such as a clockwise rotational touch operation and a counterclockwise rotational touch operation may be accepted as the specific entry.

While the present invention has been described with reference to an exemplary embodiment, it is to be understood that the invention is not limited to the disclosed exemplary embodiment. The scope of the following claims is to be accorded the broadest interpretation so as to encompass all modifications, equivalent structures and functions.

For example, the above embodiment described the case where the user registers the dominant eye in the menu item for dominant eye registration displayed on the LCD monitor unit. However, when detecting the eye approach to the optical viewfinder through the eye approach detector and detecting contact of the part (nose or the like) of the user's face to the touch panel, the system controlling circuit may automatically determine the dominant eye based on its contact position to register it as the information on the dominant eye. For example, when the part of the face comes into contact with a left side area on the touch panel, the dominant eye may be a right eye.

This application claims the benefit of Japanese Patent Application No. 2008-107519, filed on Apr. 17, 2008, which is hereby incorporated by reference herein in its entirety.

What is claimed is:

1. An image pickup apparatus which includes an optical viewfinder, comprising:
    a touch panel provided in a rear display of the apparatus;
    a registering part configured to register whether an eye of a user viewing an object image through the optical viewfinder is a right eye or a left eye;
    a setting part configured to set a non-enterable area where touch entry is not permitted in the touch panel to a first area when information indicating that the right eye is registered by the registering part, and to set the non-enterable area to a second area different from the first area when information indicating that the left eye is registered by the registering part; and
    a controller configured to control the apparatus such that the apparatus does not perform an operation in response to a touch to the non-enterable area in the touch panel and the apparatus performs an operation in response to a touch to an area other than the non-enterable area in the touch panel.

2. An image pickup apparatus according to claim 1, further comprising a detector configured to detect approach of the eye to the optical viewfinder,
    wherein the setting part sets the non-enterable area when the approach of the eye is detected by the detector.

3. An image pickup apparatus according to claim 2, wherein the setting part cancels setting of the non-enterable area when withdrawal of the eye from the optical viewfinder is detected by the detector.

4. An image pickup apparatus according to claim 1, wherein, in an entire area of the touch panel, an area other than the first area is located on a right side with respect to the optical viewfinder when the apparatus is viewed from a viewing direction of the optical viewfinder and the apparatus is at a normal position, and an area other than the second area is located on a left side with respect to the optical viewfinder when the apparatus is viewed from the viewing direction of the optical viewfinder and the apparatus is at the normal position.

5. An image pickup apparatus according to claim 4, wherein, in the entire area of the touch panel, a left end of the area other than the first area is located at a position corresponding to a left end of a viewing window of the optical viewfinder, and a right end of the area other than the second area is located at a position corresponding to a right end of the viewing window.

6. An image pickup apparatus according to claim 1, further comprising a determining part configured to determine whether a position of the apparatus is a horizontal position or a vertical position,
    wherein the setting part changes the non-enterable area depending on a determination result of the determining part.

7. A method for controlling an image pickup apparatus which includes an optical viewfinder and a rear touch panel display, comprising:
    a registering step of registering whether an eye of a user viewing an object image through the optical viewfinder is a right eye or a left eye;
    a setting step of setting a non-enterable area where touch entry is not permitted in the rear touch panel display to a first area when information indicating that the right eye is registered in the registering step and setting the non-enterable area to a second area different from the first area when information indicating that the left eye is registered in the registering step; and
    a controlling step of controlling the apparatus such that the apparatus does not perform an operation in response to a touch to the non-enterable area in the rear touch panel display and the apparatus performs an operation in response to a touch to an area other than the non-enterable area in the rear touch panel display.

8. A non-transitory computer-readable medium which stores a computer program for causing an image pickup apparatus including an optical viewfinder and a rear touch panel display to execute processing comprising:
    a registering step of registering whether an eye of a user viewing an object image through the optical viewfinder is a right eye or a left eye;
    a setting step of setting a non-enterable area where touch entry is not permitted in the rear touch panel display to a first area when information indicating that the right eye is registered in the registering step and setting the non-enterable area to a second area different from the first area when information indicating that the left eye is registered in the registering step; and
    a controlling step of controlling the apparatus such that the apparatus does not perform an operation in response to a touch to the non-enterable area in the rear touch panel display and the apparatus performs an operation in response to a touch to an area other than the non-enterable area in the rear touch panel display.

9. An image pickup apparatus which includes an optical viewfinder, comprising:
    a touch panel provided in a rear display of the apparatus;
    a detector configured to detect approach of an eye to the optical viewfinder;
    a setting part configured to set a non-enterable area where touch entry is not permitted in the rear touch panel display and which is part of the rear touch panel display, in response to detection of the approach of the eye to the optical viewfinder by the detector; and
    a controller configured to control the apparatus such that the apparatus does not perform an operation in response to a touch to the non-enterable area in the rear touch panel display and the apparatus performs an operation in response to a touch to an area other than the non-enterable area in the rear touch panel display.

10. A method for controlling an image pickup apparatus which includes an optical viewfinder and a rear touch panel display, comprising:
    a detecting step of detecting approach of an eye to the optical viewfinder;
    a setting step of setting a non-enterable area where touch entry is not permitted in the rear touch panel display and which is part of the rear touch panel display, in response to detection of the approach of the eye to the optical viewfinder in the detecting step; and
    a controlling step of controlling the apparatus such that the apparatus does not perform an operation in response to a touch to the non-enterable area in the rear touch panel display and the apparatus performs an operation in response to a touch to an area other than the non-enterable area in the rear touch panel display.

11. A non-transitory computer-readable medium which stores a computer program for causing an image pickup apparatus including an optical viewfinder and a rear touch panel display to execute processing comprising:
    a detecting step of detecting approach of an eye to the optical viewfinder;

a setting step of setting a non-enterable area where touch entry is not permitted in the rear touch panel display and which is part of the rear touch panel display, in response to detection of the approach of the eye to the optical viewfinder in the detecting step; and a controlling step of controlling the apparatus such that the apparatus does not perform an operation in response to a touch to the non-enterable area in the rear touch panel display and the apparatus performs an operation in response to a touch to an area other than the non-enterable area in the rear touch panel display.

* * * * *